June 13, 1967   J. K. BERGER   3,325,684
POWER SUPPLY OVERLOAD PROTECTION WITH AUTOMATIC RECOVERY
Filed April 27, 1965

INVENTOR.
JAMES K. BERGER
BY Harry A. Herbert Jr
Robert Kern Duncan
ATTORNEYS

United States Patent Office 3,325,684
Patented June 13, 1967

3,325,684
POWER SUPPLY OVERLOAD PROTECTION
WITH AUTOMATIC RECOVERY
James K. Berger, Sherman Oaks, Calif., assignor to the United States of America as represented by the Secretary of the Air Force
Filed Apr. 27, 1965, Ser. No. 451,368
1 Claim. (Cl. 317—23)

ABSTRACT OF THE DISCLOSURE

A transistorized electronic control system to be electrically positioned between a direct current power supply source and a direct current load that will furnish an "off-on" control signal to the power supply to protect the power supply circuit components from damage in the event of an overload occurring due to a malfunctioning load and will protect the load from damage in the event of a failure in either the power supply or the load. After the control system has provided a signal for disconnecting the load from the source due to the occurrence of a malfunction, the control system will periodically sample, at a predetermined sampling rate, the existing load; and when it is found to be no longer defective furnish a control signal to automatically maintain the power supply and load in normal operation.

---

Previous protective systems attempting to protect a power supply and a load during malfunctions have frequently been composed of fuses, thermal circuit breakers, magnetic trip circuit breakers, electronic overcurrent limiting devices and electronic continuous steady current sampling devices. All of these previous systems except the electronic systems do not act sufficiently fast to protect transistor circuits in either the supply or the load. All the aforementioned previous protective systems including the electronic systems either must be reset manually, or require the supply to be turned on before the load is connected, or are unable to start operation under an active load, or are unstable in a region of "critical load," at which point the supply is neither on nor off but somewhere between.

It is, therefore, an object of the present invention to provide a protective system that will respond with sufficient speed to protect transistor systems.

It is another object of the present invention to provide a protective system that will periodically interrogate a defective load system and automatically resume operation after the defect is cleared.

It is another object of the present invention to provide a protective system that is stable at all designed load ranges.

It is another object of the present invention to provide a protective system that will control the source so that it remains "off," i.e., the electric source supply is essentially disconnected from the load, for a predetermined length of time after a fault has occurred before sampling the condition of the load.

It is another object of the present invention to provide a protective system that interrogates the load after a fault has occurred with a current pulse to determine if the fault has been cleared.

It is still another object of the present invention to provide a system that has the ability to permit the supply to turn on and remain on even when a current is being drawn from the supply due to an active load, provided of course that the current does not exceed the desired limit.

It is yet another object of the present invention to provide a system that will operate satisfactorily when the loads are connected from a positive supply to a negative supply without a load ground.

It is another object to provide a protective system in which the component parts are not critical and operation is reliable.

Figure 1:
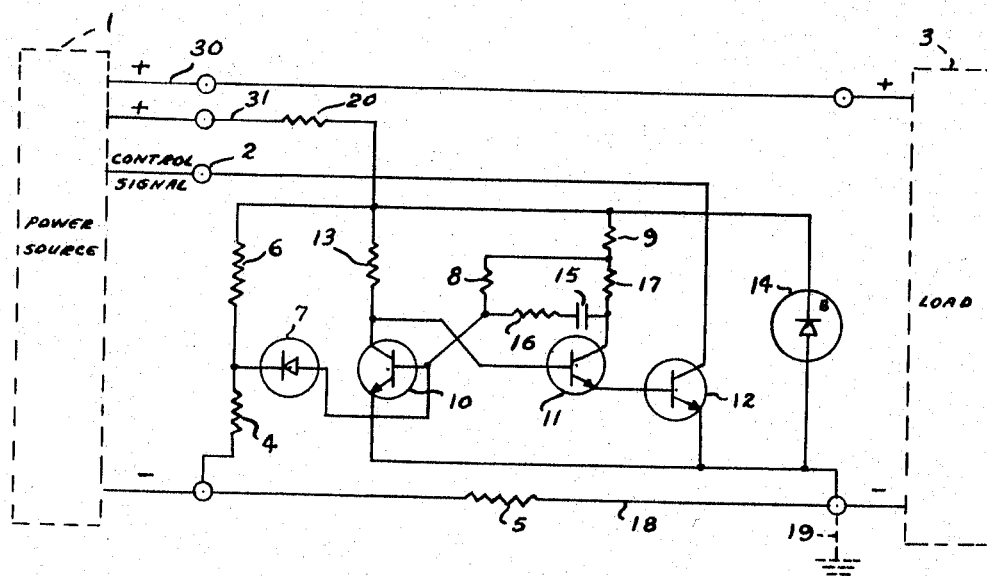

These and other objects, advantages, features and uses will become apparent to those skilled in the art as the following description and drawings are comprehended, in which FIG. 1 is a schematic diagram of an embodiment of the invented control system for monitoring the current flowing in the negative lead between the source and the load, and providing a negative voltage signal to turn off the source.

Figure 2:
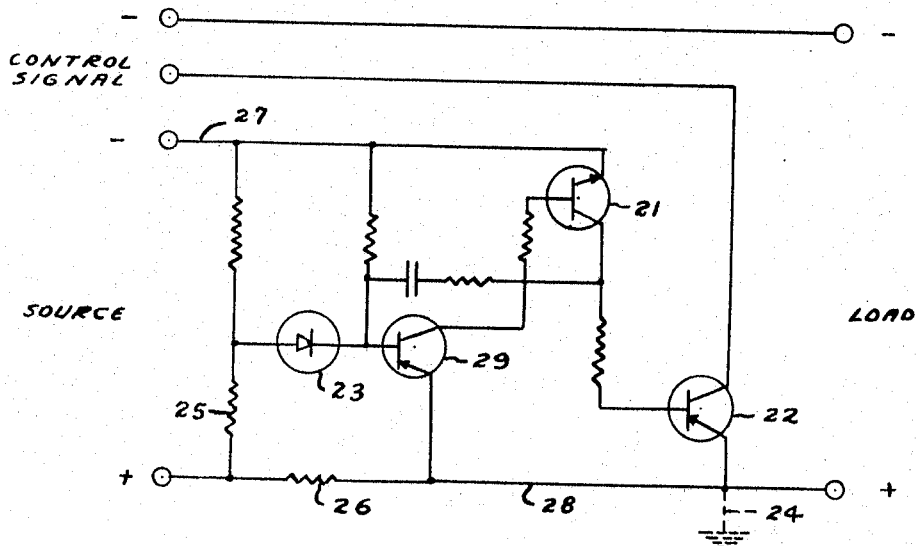

FIG. 2 is a schematic diagram of another embodiment of the control system which provides the removal of a positive voltage signal to turn the source off.

Referring to FIG. 1, power source 1 may be a conventional regulated power supply, either of the solid state type or vacuum tube type. It may also be an unregulated conventional DC power supply obtaining its energy from AC mains through a silicon controlled rectifier voltage controller. The control of the amount of AC energy flowing into electrical devices by using silicon controlled rectifiers is well known. Regulated DC power supplies, of which there are two basic types, series and shunt, are well known in the art. In most instances the invention herein disclosed will be more applicable to the series type voltage regulator rather than the shunt type. Series voltage regulators have a control potential that determines their output. In many regulators it is made a variable control so that an adjustable manual control of the output voltage from the regulator is available. These controls are well known and it is at this potential controlling point that the electrical control signal from this invention may be connected. The signal from the protective circuit may thus be used to override the control potential of the regulator to provide a shutoff of the source. The positive potential for the protective system supplied on line 31 must be independent of the positive supply to the load on line 30 and remain on after the line 30 has been opened.

In the embodiment of FIG. 1 the control signal line 2 provides an "on" control signal that is essentially an open circuit under normal operation. If a fault occurs causing excessive current to be drawn by the load 3, control signal line 2 becomes connected to the negative potential side of the source providing an "off" control signal for a predetermined period of time.

During normal operation of the power source, the load, and the protective system, the voltage drop across resistance 4 is greater than the voltage developed across the shunt resistor 5, because resistance 4 and resistance 6 are chosen such that the voltage across resistance 4 is equal to the voltage developed across shunt 5 at the desired maximum current flow from the supply source 1 to the load 3. Shunt resistor 5, which is of a relatively low ohmic value and having relative high current carrying capabilities, may be conveniently placed external to the rest of the protective system in a direct line from the source to the load. At less than rated load, diode 7 does not conduct because the relative voltage drops across resistance 4 and shunt resistance 5 causes diode 7 to be back-biased. The current through resistance 8 and resistance 9 to the base of transistor 10 is such that transistor 10 conducts and saturates. Under this condition transistor 11 is cut off because the required $V_{BE}$ of transistor 11 is greater for conduction to occur than the voltage across transistor 10 when transistor 10 is saturated. Since transistor 11 is cut off, the switch transistor 12 is also cut off as it has no base drive.

If the supply becomes overloaded or short-circuited through a fault developing in the load or its associated circuitry, the voltage drop across the shunt resistor 5 exceeds the drop across resistance 4 and then since diode 7 is no longer back-biased it conducts which cuts off transistor 10. This raises the base potential of transistor 11, causing it to conduct heavily. This drives transistor 11 into saturation, which in turn drives the switch transistor 12 into saturation. The collector of transistor 12 is connected to a point in the power supply source such that grounding that point (or connecting it to the negative potential) will turn off the supply to the load by opening line 30. Since transistor 11 has been saturated, the collector of transistor 11 is near ground potential and the base of transistor 10 has been driven negative to almost the full voltage across zener diode 14, to which capacitor 15 had been charged. The positive line 30 of power source 1 remains turned off while capacitor 15 discharges through resistance 8 and resistance 16 to the voltage established by the voltage divider composed of resistances 9 and 17. When capacitor 15 has discharged sufficiently that the base of transistor 10 goes positive, transistor 10 conducts since no voltage appears across the shunt resistance 5 when the source is off and hence diode 7 is again back-biased; and in becoming saturated transistor 10 cuts off transistor 11, allowing transistor 12 to open, turning the supply source back on and charging capacitor 15 again through resistances 9, 16 and 17. If the fault has been cleared, diode 7 will remain back-biased and the supply source, the load, and the protective system will resume normal operation. If the fault still exists, the cycle will be repeated, and under a continuing overload the protective system will cause the supply to turn off, wait a period of time, turn the supply on, turn it off again as soon as the current reaches the desired maximum value, wait a period of time, turn on again, and continue, so repeating until the overload no longer exists at which time the supply will turn on and remain on until another malfunction arises.

In designing the specific circuitry it is preferable that resistance 16 is chosen to be much smaller than resistance 8 and that resistance 8 is chosen larger than resistance 9 and resistance 17 so that the duty factor of the system is quite low. By so doing the output of the power supply under overload consists of a train of current pulses having relatively short duration and a relatively long time between pulses. The RC time constant of the circuit is controlled by varying the size of capacitor 15 and resistances 8 and 16 to adjust these time intervals. The protective system is quite stable and a relatively wide latitude in the choice of components is permissible providing the designer with a wide variety of ratios of on-time to off-time and of duty cycle ratios.

In the embodiment of the system as shown in FIG. 1 the shunt resistor is placed in the common interconnected negative potential side of the supply line 18 which may also be placed at ground potential at 19. The shunt may be placed in the common interconnected positive potential side of the supply line and the system may be used for either polarity of supply by using NPN transistor for positive supplies as shown in FIG. 1 or by using PNP transistors for negative supplies and reversing the diodes. The zener diode 14, in conjunction with resistance 20, maintains the circuit voltages and hence the time delays constant.

FIG. 2 is a schematic diagram of another embodiment of the protective system. The essential difference between the system shown in FIG. 2 and that shown in FIG. 1 is that in FIG. 2 the transistor 21, in addition to transistor 29, is normally conducting causing transistor 22 to be normally saturated. In the event of an overload transistor 21 opens, effectively opening switching transistor 22 to turn the supply off. This system may also be used for either polarity by reversing diode 23 and using PNP transistors, in places of NPN, and NPN in place of PNP. By grounding the positive lead at 24 it may be used on a negative supply. If the DC power activating the embodiment shown in FIG. 2 is derived from a common source with the supply for the load then the embodiment shown in FIG. 2 does not afford the protection from a fault occurring in the power source causing overvoltage that the embodiment shown in FIG. 1 possesses. The zener diode 14 in FIG. 1 holds the voltage across resistance 4 constant irrespective of an increase in source voltage. Thus, if the source voltage rises and produces an excessive current in the load, the protective system will disconnect the load due to the ratio of voltages across resistance 4 and shunt 5 changing. In the system of FIG. 2, the voltage across resistance 25 may tend to increase as the source voltage increases. Likewise the voltage across the shunt resistance 26 may rise as the supply source voltage increases due to an increased current drawn by the load. These voltages may increase in such a manner as to tend to keep the ratio constant. Thus if the protective system need only protect from a fault occurring in load the embodiment shown in FIG. 2 will be satisfactory. If, however, the circuit as shown in FIG. 2 is desired and protection from power source overvoltage is needed, negative lead 27 would be connected to the source negative terminal through a resistance and a zener diode connected between leads 27 and 28, similar to that shown in FIG. 1, or a separate, totally independent, supply could be used to activate the protective system.

It will be understood that many modifications and changes may be made in the constructional circuit details by those skilled in the art within the principle and scope of the invention as expressed in the appended claim.

What is claimed is:

A protective system electrically positioned between a direct current power source and a load, the said power source and the said load having a common interconnected positive potential side and a common interconnected negative potential side, the said protective system providing to the said source during normal operation an "on" control signal having open circuit characteristics, and providing an "off" control signal having the potential of one of the said sides of the source and load when the current from the said source to the said load exceeds a predetermined maximum value of current and after a predetermined time interval removing said "off" control signal and providing the said "on" signal, said "off" and "on" signal being provided in a repetitive cyclic manner until the current flow to the said load from the said source remains less in the "on" state than the said maximum current value, the protective system then continuously providing said "on" control signal, the said protective system comprising:

(a) a shunt resistor connected between the said source and the said load in one of the said potential sides for providing a first voltage proportional to the current flowing from the source to the load;

(b) a first means including a resistive voltage divider and a zener diode for providing a fixed voltage potential equal in value to the voltage developed across the said shunt resistor at the said maximum current flow;

(c) a second means including a first transistor having a base, a collector, and an emitter responsive to the said first voltage and the said fixed voltage and being in a saturated condition under normal operation and in a cut-off condition when the said current flow exceeds the said predetermined maximum value of current;

(d) a third means including a second transistor having a base, a collector, and an emitter responsive to the said first transistor and being cut off when the said first transistor is saturated and conducting heavily when the said first transistor is cut off;

(e) a fourth means including a switching transistor responsive to the said second transistor and cooperating with one potential side of the said power source and lead, for providing the said control signal, and being cut off when said second transistor is cut off and being saturated when the said second transistor is conducting heavily; and (f) a resistor-capacitor means for providing the said predetermined time interval, cooperating with the base of the said first transistor and the collector of the said second transistor for changing said first transistor from a cut-off condition to a saturated condition after the said predetermined time interval.

References Cited

UNITED STATES PATENTS

| | | | |
|---|---|---|---|
| 3,049,632 | 8/1962 | Staples | 307—88.5 |
| 3,086,163 | 4/1963 | Francois | 317—33 |
| 3,125,715 | 3/1964 | Brooks | 317—33 X |

MILTON O. HIRSHFIELD, *Primary Examiner.*

J. D. TRAMMELL, *Assistant Examiner.*